United States Patent
Wang et al.

(10) Patent No.: US 7,112,369 B2
(45) Date of Patent: Sep. 26, 2006

(54) NANO-SIZED POLYMER-METAL COMPOSITES

(75) Inventors: Xiaorong Wang, Hudson, OH (US); James E. Hall, Mogadore, OH (US); Georg G. A. Böhm, Akron, OH (US); Chenchy Jeffrey Lin, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/791,491

(22) Filed: Mar. 2, 2004

(65) Prior Publication Data

US 2006/0083926 A1 Apr. 20, 2006

(51) Int. Cl.
*B32B 5/16* (2006.01)

(52) U.S. Cl. .................. 428/403; 428/407; 427/217; 427/222

(58) Field of Classification Search ............... 428/403, 428/407; 525/902; 427/217, 222
See application file for complete search history.

(56) References Cited

U.S. PATENT DOCUMENTS

| | | | |
|---|---|---|---|
| 3,972,963 A | 8/1976 | Schwab et al. | |
| 4,233,409 A | 11/1980 | Bulkley | |
| 4,247,434 A | 1/1981 | Vanderhoff et al. | |
| 4,463,129 A | 7/1984 | Shinada et al. | |
| 4,543,403 A | 9/1985 | Isayama et al. | |
| 4,659,790 A * | 4/1987 | Shimozato et al. | ........... 526/87 |
| 4,764,572 A | 8/1988 | Bean, Jr. | |
| 4,773,521 A | 9/1988 | Chen | |
| 4,788,254 A | 11/1988 | Kawakubo et al. | |
| 4,829,130 A | 5/1989 | Licchelli et al. | |
| 4,829,135 A | 5/1989 | Gunesin et al. | |
| 4,837,274 A | 6/1989 | Kawakubo et al. | |
| 4,837,401 A | 6/1989 | Hirose et al. | |
| 4,870,144 A | 9/1989 | Noda et al. | |
| 4,871,814 A | 10/1989 | Gunesin et al. | |
| 4,904,730 A | 2/1990 | Moore et al. | |
| 4,904,732 A | 2/1990 | Iwahara et al. | |
| 4,906,695 A | 3/1990 | Blizzard et al. | |
| 4,920,160 A | 4/1990 | Chip et al. | |
| 4,942,209 A | 7/1990 | Gunesin | |
| 5,036,138 A | 7/1991 | Stamhuis et al. | |
| 5,075,377 A | 12/1991 | Kawabuchi et al. | |
| 5,120,379 A | 6/1992 | Noda et al. | |
| 5,130,377 A | 7/1992 | Trepka et al. | |

(Continued)

FOREIGN PATENT DOCUMENTS

EP 143500 6/1985

(Continued)

OTHER PUBLICATIONS

An article entitled "Dendritic Macromolecules: Synthesis of Starburst Dendrimers" Donald A. Tomalia et al., Macromolecules, vol. 19, No. 9, 1986, contribution from Functional Polymers/Processes and the Analytical Laboratory, Dow Chemical, Midland, MI 48640, pp. 2466-2468.

(Continued)

*Primary Examiner*—H. T. Le
(74) *Attorney, Agent, or Firm*—Scott McCollister; Meredith E. Palmer

(57) ABSTRACT

A polymer nanoparticle is provided. The nanoparticle includes an inner layer having alkenylbenzene monomer units. The nanoparticle further includes an outer layer having monomer units selected from conjugated dienes, alkylenes, alkenylbenzenes, and mixtures thereof. The nanoparticle has at least one functional group associated with the outer layer. The nanoparticle further has at least one metal complexed with said functional group. The nanoparticles can be used as a templates for preparation of nano-sized metal crystals and polymer-metal nanocomposite.

26 Claims, 3 Drawing Sheets

Original Particles

U.S. PATENT DOCUMENTS

| | | |
|---|---|---|
| 5,169,914 A | 12/1992 | Kaszas et al. |
| 5,219,945 A | 6/1993 | Dicker et al. |
| 5,227,419 A | 7/1993 | Moczygemba et al. |
| 5,237,015 A | 8/1993 | Urban |
| 5,241,008 A | 8/1993 | Hall |
| 5,247,021 A | 9/1993 | Fujisawa et al. |
| 5,256,736 A | 10/1993 | Trepka et al. |
| 5,262,502 A | 11/1993 | Fujisawa et al. |
| 5,290,873 A | 3/1994 | Noda et al. |
| 5,290,875 A | 3/1994 | Moczygemba et al. |
| 5,290,878 A | 3/1994 | Yamamoto et al. |
| 5,331,035 A | 7/1994 | Hall |
| 5,336,712 A | 8/1994 | Austgen, Jr. et al. |
| 5,395,902 A | 3/1995 | Hall |
| 5,399,628 A | 3/1995 | Moczygemba et al. |
| 5,405,903 A | 4/1995 | Van Westrenen et al. |
| 5,421,866 A | 6/1995 | Stark-Kasley et al. |
| 5,436,298 A | 7/1995 | Moczygemba et al. |
| 5,438,103 A | 8/1995 | DePorter et al. |
| 5,447,990 A | 9/1995 | Noda et al. |
| 5,462,994 A | 10/1995 | Lo et al. |
| 5,487,054 A | 1/1996 | McKee et al. |
| 5,514,753 A | 5/1996 | Ozawa et al. |
| 5,525,639 A | 6/1996 | Keneko et al. |
| 5,527,870 A | 6/1996 | Maeda et al. |
| 5,580,925 A | 12/1996 | Iwahara et al. |
| 5,587,423 A | 12/1996 | Brandstetter et al. |
| 5,594,072 A | 1/1997 | Handlin, Jr. et al. |
| 5,614,579 A | 3/1997 | Roggeman et al. |
| 5,627,252 A | 5/1997 | De La Croi Habimana |
| 5,688,856 A | 11/1997 | Austgen, Jr. et al. |
| 5,728,791 A | 3/1998 | Tamai et al. |
| 5,733,975 A | 3/1998 | Aoyama et al. |
| 5,739,267 A | 4/1998 | Fujisawa et al. |
| 5,763,551 A | 6/1998 | Wunsch et al. |
| 5,773,521 A | 6/1998 | Hoxmeier et al. |
| 5,777,037 A | 7/1998 | Yamanaka et al. |
| 5,811,501 A | 9/1998 | Chiba et al. |
| 5,834,563 A | 11/1998 | Kimura et al. |
| 5,847,054 A | 12/1998 | McKee et al. |
| 5,849,847 A | 12/1998 | Quirk |
| 5,855,972 A | 1/1999 | Kaeding |
| 5,883,173 A | 3/1999 | Elspass et al. |
| 5,891,947 A | 4/1999 | Hall et al. |
| 5,905,116 A | 5/1999 | Wang et al. |
| 5,955,537 A | 9/1999 | Steininger et al. |
| 5,986,010 A | 11/1999 | Clites et al. |
| 5,994,468 A | 11/1999 | Wang et al. |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,549 A | 5/2000 | Li et al. |
| 6,060,559 A | 5/2000 | Feng et al. |
| 6,087,016 A | 7/2000 | Feeney et al. |
| 6,087,456 A | 7/2000 | Sakaguchi et al. |
| 6,106,953 A | 8/2000 | Zimmermann et al. |
| 6,117,932 A | 9/2000 | Hasegawa et al. |
| 6,121,379 A | 9/2000 | Yamanaka et al. |
| 6,147,151 A | 11/2000 | Fukumoto et al. |
| 6,180,693 B1 | 1/2001 | Tang et al. |
| 6,191,217 B1 | 2/2001 | Wang et al. |
| 6,204,354 B1 | 3/2001 | Wang et al. |
| 6,255,372 B1 | 7/2001 | Lin et al. |
| 6,268,451 B1 | 7/2001 | Faust et al. |
| 6,277,304 B1 | 8/2001 | Wei et al. |
| 6,348,546 B1 | 2/2002 | Hiiro et al. |
| 6,359,075 B1 | 3/2002 | Wollum et al. |
| 6,420,486 B1 | 7/2002 | DePorter et al. |
| 6,437,050 B1 | 8/2002 | Krom et al. |
| 6,489,378 B1 | 12/2002 | Sosa et al. |
| 6,573,330 B1 | 6/2003 | Fujikake et al. |
| 6,598,645 B1 | 7/2003 | Larson |
| 6,649,702 B1 * | 11/2003 | Rapoport et al. ........... 525/299 |
| 6,689,469 B1 | 2/2004 | Wang et al. |
| 6,706,813 B1 | 3/2004 | Chiba et al. |
| 6,750,297 B1 | 6/2004 | Yeu et al. |
| 6,759,464 B1 | 7/2004 | Ajbani et al. |
| 6,777,500 B1 | 8/2004 | Lean et al. |
| 6,780,937 B1 | 8/2004 | Castner |
| 6,835,781 B1 | 12/2004 | Kondou et al. |
| 6,872,785 B1 | 3/2005 | Wang et al. |
| 6,875,818 B1 | 4/2005 | Wang |
| 2002/0045714 A1 | 4/2002 | Tomalia et al. |
| 2002/0095008 A1 | 7/2002 | Heimrich et al. |
| 2002/0144401 A1 | 10/2002 | Vines et al. |
| 2003/0004250 A1 | 1/2003 | Ajbanl et al. |
| 2003/0032710 A1 | 2/2003 | Larson |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 * | 10/2003 | Wang et al. ................. 428/401 |
| 2003/0225190 A1 | 12/2003 | Borbely et al. |
| 2004/0059057 A1 | 3/2004 | Swisher et al. |
| 2004/0127603 A1 | 7/2004 | Lean et al. |
| 2004/0143064 A1 | 7/2004 | Wang |
| 2004/0198917 A1 | 10/2004 | Castner |
| 2005/0101743 A1 | 5/2005 | Stacy et al. |
| 2005/0203248 A1 | 9/2005 | Zheng et al. |

FOREIGN PATENT DOCUMENTS

| | | |
|---|---|---|
| EP | 0 265 142 A2 | 4/1988 |
| EP | 265142 | 4/1988 |
| EP | 0 590 491 A2 | 4/1994 |
| EP | 1 099 728 A1 | 5/2001 |
| EP | 1 134 251 A1 | 9/2001 |
| JP | 01279943 | 1/1989 |
| JP | 05132605 | 5/1993 |
| JP | 08-199062 | 8/1996 |
| WO | WO 91/04992 | 4/1991 |
| WO | WO 01/87999 A2 | 11/2000 |
| WO | WO 02/31002 A1 | 4/2002 |
| WO | WO 02/081233 A1 | 10/2002 |
| WO | WO 02/100936 | 12/2002 |
| WO | WO 03/085040 A2 | 10/2003 |
| WO | WO2004/058874 | 7/2004 |

OTHER PUBLICATIONS

An article entitled "Preparation and Characterization of Heterophase Blends of Polycaprolactam and Hydrogenated Polydienes" David F. Lawson, et al. pp. 2331-2351, Central Research Labs., The Firestone Tire and Rubber Co., Akron, Ohio 44317, Journal of Applied Polymer Science, vol. 39, 1990 John Wiley & Sons, Inc.

Star Polymers by Immobilizing Functional Block Copolymers, by Koji Ishizu, Tokyo Institute of Technology, Meguro-ku, Tokyo, Japan, Star and Hyperbranched Polymers, 1999, ISBN 0-8247-1986-7.

Formation of Worm-like Micelles from a Polystyrene-Polybutadiene-Polystyrene Block Copolymer in Ethyl Acetate, Canham et al., J.C.S. Faraday I, 1980, 76, 1857-1867.

Anomaious Behaviour of Solutions of Styrene-Butadiene Block Copolymers In Some Solvents, Tuzar et al., Makromol. Chem. 178, 22743-2746 (1977).

Association of Block Copolymers In Selective Solvents, 1 Measurements on Hydrogenated Poly(styrene-isoprene) in Decane and in trans-Decalin, Mandema et al., Makromol. Chem. 180, 1521-1538 (1979).

Light-Scattering Studies of a Polystyrene-Poly(methylmethacrylate) Two-Block Copolymer in Mixed Solvents, Utiyama et al. Macromolecules vol. 7, No. 4, Jul.-Aug., 1974.

Greenwood, N.N.; Earnshaw, A., Chemistry of the Elements, pp. 1126-1127, Pergaroen Press, New York 1984.

Functionalized Core-Shell Polymers Prepared by Microemulsion Polymerization, E. Mendizabal et al., Dept. of Ingenieria Quimica, Unviv. De Guadalajara, MX, 477/ANTE 97/1733-1737.

Kink-Block and Gauche-Block Structures of Bimolecular Films, Gehard Lagaly, Chem. Int. Ed. Engl. vol. 15 (1976) No. 10, pp. 575-586.

Linear Viscoelasticity of Disordered Polystyrene-Polyisoprene . . . Layered-Silicate Nanocomposites, J. Ren, Dept. of Chem Eng. Univ. of Houston, Macromol. 2000, pp. 3739-3746.

Rheology of End-Tethered Polymer Layered Silicate Nanocomposites, R. Krishnamoorti et al., Macromol. 1997, 30, 4097-4102.

Rheology of Nanocomposites Based on Layered Silicates and Polyamide-12, B. Hoffman et al., Colloid Polm. Sci. 278:629-636 (2000).

Quaternary Ammonium Compounds, Encyclopedia of Chem Tech., 4th Ed. vol. 20, 1996, Wiley & Sons, pp. 739-767.

R.P. Quirk and S.C. Galvan, Macromolecules, 34, 1192-1197 (2001).

M. Moller, J.P. Spaz, A. Roescher, S. Mobmer, S.T. Selvan, H.A. Klok, Macromol. Symp. 117, 207-218 (1997).

T. Cosgrove, J.S. Phipps, R.M. Richardson, Macromolecules, 26, 4363-4367 (1993).

S. Mossmer, J.P. Spatz, M.Moller, T. Aberle, J. Schmidt, W. Burchard, Macromol. 33, 4791-4798 (2000).

Functionalized Core Shell Polymers Prepared by Microemulsion Polymerization,E. Mendizabal, J.E. Pugl, A. Agular, S. Gonzalez-Villegas, 477/Antec '97/1733-1737.

Ultrahydrophobic and Ultrayophobic Surfaces: Some Comments and Examples, Wei Chen et al., The ACS Journal of Surfaces and Colloids, May 11, 1999, vol. 15, No. 10, pp. 3395-3399, Polymer Science and Engineering Dept., Univ. of MA, Amherst, MA 01003.

Super-Repellent Composite Fluoropolymer Surfaces, S.R. Coulson, I. Woodward, J.P.S. Badyal, The Journal of Physical Chemistry B, vol. 104, No. 37, Sep. 21, 2000, pp. 8836-8840, Dept. of Chemistry, Science Laboratories, Durham University, Durham, DH1 3LE, England, U.K.

Transformation of a Simple Plastic into a Superhydrophobic Surface, H. Yildirim Erbil et al., Science vol. 299, Feb. 28, 2003, pp. 1377-1380.

* cited by examiner

Maleated Particles

Original Particles

Film under blue light

Nano-sized CdS crystals TEM picture

NANO-SIZED POLYMER-METAL COMPOSITES

BACKGROUND OF THE INVENTION

The present invention relates to polymer nanoparticles and methods for their preparation. The invention advantageously provides mechanisms for surface modifications, functionalization, and general characteristic tailoring to improve performance in various host compositions.

Polymer nanoparticles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

Nanoparticles can be discrete particles uniformly dispersed throughout a host composition. Nanoparticles preferably are monodisperse in size and uniform in shape. However, controlling the size of nanoparticles during polymerization and/or the surface characteristics of such nanoparticles can be difficult. Accordingly, achieving better control over the surface composition of such polymer nanoparticles also is desirable.

Rubbers may be advantageously modified by the addition of various polymer compositions. The physical properties of rubber moldability and tenacity are often improved through such modifications. Of course, however, the simple indiscriminate addition of nanoparticles to rubber is likely to cause degradation of the matrix material, i.e., the rubber, characteristics. Moreover, it is expected that primarily the selection of nanoparticles having suitable size, material composition, and surface chemistry, etc., will improve the matrix characteristics.

In this regard, development of nanoparticles having a outer layer which would be compatible with a wide variety of matrix materials is desirable because discrete particles could likely disperse evenly throughout the host to provide a uniform matrix composition. However, the development of a process capable of reliably producing acceptable nanoparticles has been a challenging endeavor. For example, the solubility of various monomers in traditional alkane solvents has made solution polymerization a difficult process by which to achieve nanoparticles having a variety of outer layers. Moreover, the development of a solution polymerization process producing reliable nanoparticles, particularly nanoparticles advantageously employed in rubber compositions, has been elusive.

Commonly owned U.S. Pat. No. 6,437,050 is directed to polymer nanoparticles and a method of forming nanoparticles with desired surface characteristics and size. Commonly owned U.S. patent application Ser. No. 10/223,393 (filed Aug. 19, 2002) includes a method of controlling the surface characteristics of polymer nanoparticles via surface functionalization. In this application the functional groups remain inside the nanoparticle in the form of an organic reaction residue.

Nano-scale metal composites have also been used advantageously in a variety of fields including, but not limited to, information technology, medicine and health, material and manufacturing, aeronautics and space exploration, environmental, and energy fields. Formation of nano-scale metal composites has often proven difficult due to the expense and difficulty of creating known templates, as well as the often difficult step of separating the composites from the template.

Accordingly, it would be desirable to develop polymer nanoparticles with desirable surface characteristics and size. It would also be desirable to develop a process for using these nanoparticles as templates to produce nano-scale metal composites.

SUMMARY OF THE INVENTION

A polymer nanoparticle is provided. The nanoparticle includes an inner layer having alkenylbenzene monomer units. The nanoparticle further includes an outer layer having monomer units selected from conjugated dienes, alkylenes, alkenylbenzenes, and mixtures thereof. The nanoparticle has at least one functional group associated with the outer layer. The nanoparticle further has at least one metal complexed with said functional group.

A process for forming functionalized nanoparticles is also provided. The process includes polymerizing alkenylbenzene monomer and conjugated diene monomer in a hydrocarbon solvent to form a diblock polymer. After formation of the diblock polymer, micelles of the diblock polymer are formed. At least one crosslinking agent is added to the micelles to form crosslinked nanoparticles having a poly (alkenylbenzene) core and an outer poly(conjugated diene) layer from the micelles. The poly(conjugated diene) layer is optionally hydrogenated to form nanoparticles containing a poly(alkenylbenzene) core and a polycrystalline outer layer. After formation, the nanoparticles are reacted with a compound including at least one functional group to form functionalized nanoparticles. The reaction may be carried out before or after hydrogenation. After functionalization, a metal is added and allowed to complex to the functional groups.

A metal nano-composite is provided. The nanocomposite is formed by first polymerizing alkenylbenzene and conjugated diene monomer in a hydrocarbon solvevnt to form a diblock polymer. A mixture including micelles of the diblock polymer is formed and a cross-linking agent is added to the mixture. The cross linking agent serves to crosslink the micelles to form nanoparticles having an inner layer including alkenyl benzene monomer units and an outer layer having monomer units selected from alkenylbenzene, conjugated dienes, and mixtures thereof. The nanoparticles are combined with at least one compound having a functional group to form functionalized nanaparticles. The functionalized nanoparticles are then contacted with at least one metal such that the metal complexes with the functional groups to form metal nano-composites. An optional hydrogenation step may be performed before or after functionalization.

Herein throughout, unless specifically stated otherwise:

"vinyl-substituted aromatic hydrocarbon" and "alkenylbenzene" are used interchangeably;

"maleic anhydride" encompasses dicarboxylic anhydrides including maleic anhydride, acetic anhydride, succinic anhydride, phthalic anhydride, oxalic anhydride, malonic anhydride, glutaric anhydride, dimethyl malonic anhydride, adipic anhydride, pimelic anhydride, α,α-dimethyl succinic anhydride, sebacic anhydride, fumaric anhydride, itaconic anhydride, citraconic anhydride, isophthalic anhydride, telephthalic anhydride, tetrachloroterephthalic anhydride, and mixtures thereof;

"maleated nanoparticle" refers to a nanoparticle with at least one of the above maleic anhydrides attached thereto; and "rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

General Nanoparticle Process of Formation

Figure 2:
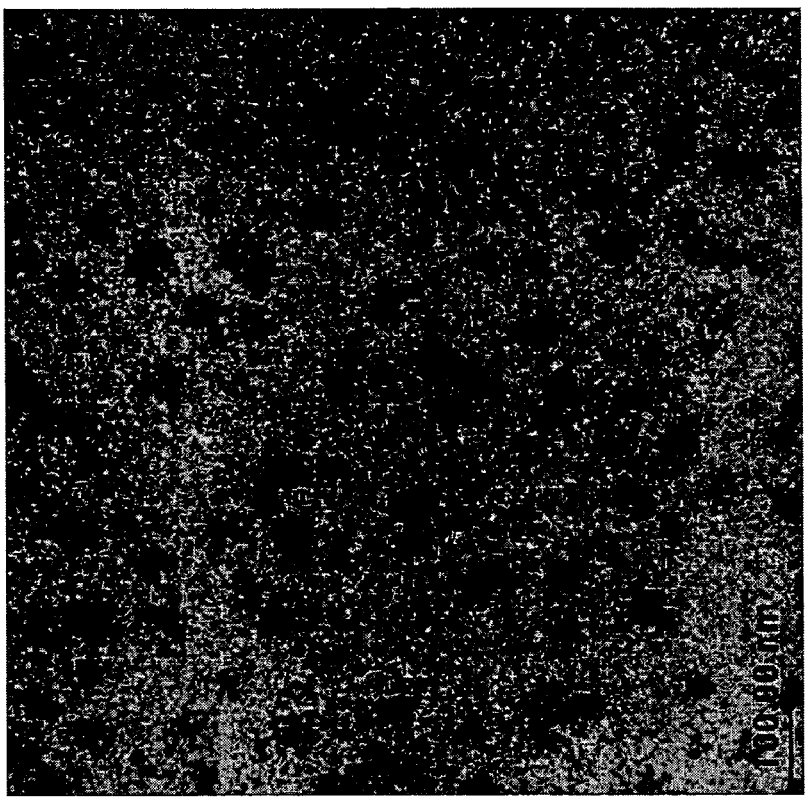
FIG. 2 is a TEM photograph of maleated polymer nanoparticles formed in accordance with EXAMPLE 2.

One exemplary functionalized polymer nanoparticle of the present invention is formed from diblock polymer chains having at least a poly(conjugated diene) block and a poly(alkenylbenzene) block. The poly(alkenylbenzene) blocks may be crosslinked to form the desired nanoparticles. After nanoparticle formation, the resultant nanoparticles are reacted with an organic compound to form functionalized nanoparticles. The functionalized nanoparticles preferably have at least one functional group associated with an outer layer of the nanoparticle. The functional group may be located within the outer layer or on an exterior of the nanoparticle. The functionalized nanoparticles have diameters—expressed as a mean average diameter—that are preferably less than about 100 nm, more preferably less than about 75 nm, and most preferably less than about 50 nm. The nanoparticles preferably are substantially monodisperse and uniform in shape. The dispersity is represented by the ratio of $M_w$ to $M_n$, with a ratio of 1 being substantially monodisperse. The polymer nanoparticles of the present invention preferably have a dispersity less than about 1.3, more preferably less than about 1.2, and most preferably less than about 1.1. Moreover, the nanoparticles are preferably spherical, though shape defects are acceptable, provided the nanoparticles generally retain their discrete nature with little or no polymerization between particles.

The nanoparticles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination. However, as more fully described herein below, selection of a solvent in which one polymer forming the nanoparticles is more soluble than another polymer forming the nanoparticles is important in micelle formation.

With respect to the monomers and solvents identified herein, nanoparticles are formed by maintaining a temperature that is favorable to polymerization of the selected monomers in the selected solvent(s). Preferred temperatures are in the range of about −40 to 250° C., with a temperature in the range of about 0 to 150° C. being particularly preferred. As described in more detail below, the interaction of monomer selection, temperature, and solvent facilitates the formation of block polymers which form micelles and ultimately the desired nanoparticles.

According to one embodiment of the invention, a diblock polymer is formed of vinyl aromatic hydrocarbon monomers and conjugated diene monomers in the hydrocarbon solvent. The diblock polymer contains at least a first end block that is soluble in the dispersion solvent, preferably a conjugated diene monomer, and at least a second end block which is less soluble in the dispersion solvent, preferably a vinyl-substituted aromatic hydrocarbon monomer. Moreover, in one preferred embodiment, a vinyl-substituted aromatic hydrocarbon monomer is chosen, the polymer of which is generally insoluble in the dispersion solvent.

As is known in the art, such a diblock copolymer may be formed by living anionic polymerization, in which a vinyl-substituted aromatic hydrocarbon monomer is added to a completely polymerized conjugated diene monomer. Another method of forming substantially diblock polymers is the living anionic copolymerization of a mixture of monomers, such as a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Under these conditions, the conjugated diene generally polymerizes first, followed by the polymerization of the vinyl-substituted aromatic hydrocarbon. Of course, certain advantages, as described below may be achieved via a random polymerization of at least one block of the polymer.

Nonetheless, it is generally preferred that a vinyl substituted aromatic hydrocarbon polymerize last, positioning the living end of the polymerizing polymer on a vinyl aromatic block to facilitate later cross-linking.

Such copolymers, formed by either method, are believed to aggregate to form micelle-like structures with, for example, vinyl-substituted aromatic blocks directed toward the centers of the micelles and conjugated diene blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 40 and 100° C., more preferably between about 50 and 80° C.

After the micelles have formed, additional conjugated diene monomer and/or vinyl-substituted aromatic hydrocarbon monomer can be added to the polymerization mixture as desired.

After formation of the micelles, a cross-linking agent is added to the polymerization mixture. Preferably, a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the desired nanoparticle. Consequently, nanoparticles are formed from the micelles with a core including, for example, styrene monomer units and a outer layer including, for example, butadiene monomer units.

The conjugated diene monomers contemplated for the block polymer are those soluble in non-aromatic hydrocarbon solvents. $C_4$–$C_8$ conjugated diene monomers are the most preferred. Exemplary conjugated diene monomers include 1,3-butadiene, isoprene, 1,3-pentadiene, 2,3-dimethyl-1,3-butadiene, 1,3-hexodiene, 2-methyl-1,3-pentadiene, 3,4-dimethyl-1,3-hexodiene, 4,5-diethyl-1,3-octadiene, phenyl-1,3-butadiene, and mixtures thereof. An especially preferred conjugated diene is 1,3-butadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is not greater than 18, as well as any di- or tri-vinyl substituted aromatic hydrocarbons, and mixtures thereof.

The diblock polymer, preferably has $M_w$ of about 5,000 to 200,000, more preferably between about 10,000 and 100,000. A typical diblock polymer will be comprised of 5 to 95% by weight conjugated diene and 5 to 95% by weight vinyl-substituted aromatic hydrocarbon, more preferably 20 to 80% by weight, and most preferably 40 to 60% by weight of each contributed monomer type.

The micelle formed by the polymerization of vinyl-substituted aromatic hydrocarbons and conjugated diene monomers is preferably crosslinked to enhance the uniformity and permanence of shape and size of the resultant nanoparticle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

A 1,2-microstructure controlling agent or randomizing modifier is optionally used to control the 1,2-microstructure in the conjugated diene contributed monomer units, such as 1,3-butadiene, of the nanoparticle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the outer layer of the polymer nanoparticle. The 1,2-microstructure content of the conjugated diene units is preferably between about 5 and 95%, more preferably between about 1 and 99%.

Without being bound by theory, it is believed that an exemplary micelle will be comprised of ten to five hundred diblock polymers yielding, after crosslinking, a nanoparticle having a $M_w$ of between about 5,000 and 10,000,000, preferably between about 5,000 and 4,500,000.

Functionalization of Polymer Nanoparticles

After micelle formation, or alternatively after crosslinking, the polydiene blocks may be functionalized to form an outer layer functionalized polymer nanoparticle. The functional group is preferably selected from the group consisting of maleimide, hydroxyl, carboxy, formyl, azocarboxy, epoxide, amino, and mixtures thereof.

Without being bound by theory, it is believed that a functional group is added to the nanoparticle by reacting a compound including the desired functional group with the polydiene blocks of the nanoparticles.

The reaction is preferably carried out in a organic solvent in an inert atmosphere at a temperature between about 50 and 250° C. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane, and the like. These hydrocarbons may be used individually or in combination. Of course, other known methods for conducting such reactions are contemplated.

The functional group reacts with double bonds present in the outer layer of the nanoparticles. Preferably the reaction will reach greater than 1%, more preferably greater than 10% completion.

Metal Nanocomposite Formation

Functionalized nanoparticles produced in accordance with the present invention may be advantageously utilized as templates in the formation of metal nanocomposites. The formation of metal nanocomposites is preferably carried out by exposing functionalized nanoparticles to metals, preferably metal ions in solution. The metal is then capable of complexing with functional groups located throughout an outer layer of the functionalized nanoparticle. The poly (conjugated diene) and/or polyalkylene layer may restrict the growth of the metal nanocomposites, thus providing size control of the metal nanocomposites. A more dense outer layer produces smaller nanocomposites, while a less dense outer layer produces larger nanocomposites.

Metals contemplated for use in the present invention include those known in the art as useful in the form of nanocomposites, including but not limited to Cu, Ti, Fe, Cd, Ni, Pd, and mixtures thereof. The formation of the metal nanocomposites is preferably carried out at temperature of between about 0 and 100° C., more preferably between about 0 and 5° C. Preferred solvents useful in the formation include Toluene, THF, water, alcohol, and mixtures thereof.

Metal nanocomposites produced in accordance with the present invention preferably have a mean average diameter less than about 50 nm, more preferably less than about 30 nm, and most preferably less than about 10 nm.

Structural Modifications

In an alternative embodiment, an outer layer of the functionalized polymer nanoparticle is a copolymer including at least one alkenylbenzene monomer unit and at least one conjugated diene monomer unit. The copolymer may be random or ordered. Accordingly, the outer layer may include an SBR rubber. Herein throughout, references to a poly (conjugated diene) outer layer are understood to include copolymers of the type described here.

Similarly, the density of the nanoparticle may be controlled by including diblock and monoblock polymer chains in the micelles. One method for forming such polymer chains includes forming a first polymer of conjugated diene monomers in the hydrocarbon solvent. After formation of the first polymer, a second monomer is added to the polymerization, along with additional initiator. The second monomer polymerizes onto the first polymer to form a diblock polymer as well as forming a separate second polymer which is a mono-block polymer. The diblock polymer contains at least a first end block that is soluble in the dispersion solvent, preferably a conjugated diene monomer, and a second end block which is less soluble in the dispersion solvent, preferably a vinyl-substituted aromatic hydrocarbon monomer. In a preferred embodiment, a vinyl-substituted aromatic hydrocarbon is chosen which as a polymer is generally insoluble in the dispersion solvent.

The multi-block polymer preferably has $M_w$ of about 5,000 to 10,000,000 more preferably between about 10,000 and 200,000. A typical diblock polymer will be comprised of 5 to 95% by weight conjugated diene and 5 to 95% by weight vinyl-substituted aromatic hydrocarbon, more preferably 20 to 80% by weight, and most preferably 30 to 70% by weight of each contributed monomer type. Each block preferably has $M_w$ between about 1,000 and 10,000,000, more preferably between about 2,000 and 5,000,000.

The density of the poly(conjugated diene) outer layer of the nanoparticles may be controlled by manipulating the ratio of diblock to mono-block polymer chains. This ratio may be manipulated by altering the amount of initiator added during each step of the polymerization process. For example, a greater amount of initiator added during the polymerization of the conjugated diene monomer than added during the polymerization of the alkenylbenzene monomer would favor diblock formation over mono-block formation, resulting in a high density outer layer. Conversely, a greater amount of initiator added during the polymerization of the alkenylbenzene monomer than added during the polymerization of the conjugated diene monomer would favor mono-block formation over diblock formation, resulting in a low-density outer layer. The ratio of mono-blocks to diblocks can be from 1 to 99, preferably 10 to 90, more preferably 20 to 80.

Hydrogenation of a Nanoparticle Outer Later

After micelle formation, or alternatively, after crosslinking, the polydiene blocks may be hydrogenated to form a modified outer layer. A hydrogenation step may also be carried out after functionalization of the nanoparticles. A hydrogenation step may be carried out by methods known in the art for hydrogenating polymers, particularly polydienes. A preferred hydrogenation method includes placing the crosslinked nanoparticles in a hydrogenation reactor in the presence of a catalyst. After the catalyst has been added to the reactor, hydrogen gas ($H_2$) is charged to the reactor to begin the hydrogenation reaction. The pressure is adjusted to a desired range, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $^1H$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octanoate, nickel ethylhexanoate, and mixtures thereof.

The outer layer formed by an optional hydrogenation step will vary depending on the identity of the monomer units utilized in the formation of the nanoparticle outer layer, particularly the poly(conjugated diene) blocks. For example, if the poly(conjugated diene) block contains 1,3-butadiene monomer units, the resultant nanoparticle layer after hydrogenation will be a crystalline poly(ethylene) layer. In another embodiment, a layer may include both ethylene and propylene units after hydrogenation if the non-hydrogenated poly(conjugated diene) block contains isoprene monomer units. It should be noted that the non-hydrogenated poly (conjugated diene) block may contain a mixture of conjugated diene monomer units, or even alkenylbenzene units, resulting in a mixture of monomer units after hydrogenation.

Initiators

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$–$C_{20}$ hydrocarbyl radical, preferably a $C_2$–$C_8$ hydrocarbyl radical, and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Anionic initiators generally are useful in amounts ranging from about 0.01 to 60 millimoles per hundred grams of monomer charge.

Polymer/Metal Nanocomposite Applications

A variety of applications are contemplated for use in conjunction with the nanoparticles of the present invention. Furthermore, the several mechanisms described herein for modifying the nanoparticles render them suitable for different applications. All forms of the present inventive nanoparticles are, of course, contemplated for use in each of the exemplary applications and all other applications envisioned by the skilled artisan.

After the functionalized polymer nanoparticles have been formed, they may be blended with a rubber to improve the physical characteristics of the rubber composition. Functionalized nanoparticles are useful modifying agents for rubbers because they are discrete particles which are capable of dispersing uniformly throughout the rubber composition, resulting in uniformity of physical characteristics. Furthermore, certain of the present functionalized nanoparticles are advantageous because the outer layer of poly(conjugated diene), especially vinyl-modified poly(conjugated diene), is capable of bonding with the rubber matrix due to the accessibility of the double bonds in the poly(conjugated diene).

The present polymer nanoparticles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the inclusion of the present nanoparticles have demonstrated rubbers having improved tensile and tear strength of at least about 30% over a rubber modified with non-spherical copolymers.

Furthermore, nanoparticles with hydrogenated outer layers may demonstrate improved compatibility with specific rubbers. For example, nanoparticles including a hydrogenated polyisoprene outer layer may demonstrate superior bonding with and improved dispersion in an EPDM rubber matrix due to the compatibility of hydrogenated isoprene with EPDM rubber.

Additionally, nanoparticles with copolymer surfaces may demonstrate improved compatibility with rubbers. The copolymer tails with the outer layer of the nanoparticles may form a brush-like surface. The host composition is then able to diffuse between the tails allowing improved interaction between the host and the nanoparticles.

Additionally, possible applications include laser diode, memory devices, catalysis and production of inorganic crystals.

The following examples are provided to help illustrate the invention. The examples are not intended to limit the scope of the invention as defined by the appended claims.

EXAMPLE 1

Preparation of PBD-PS Nanoparticles

Figure 1:
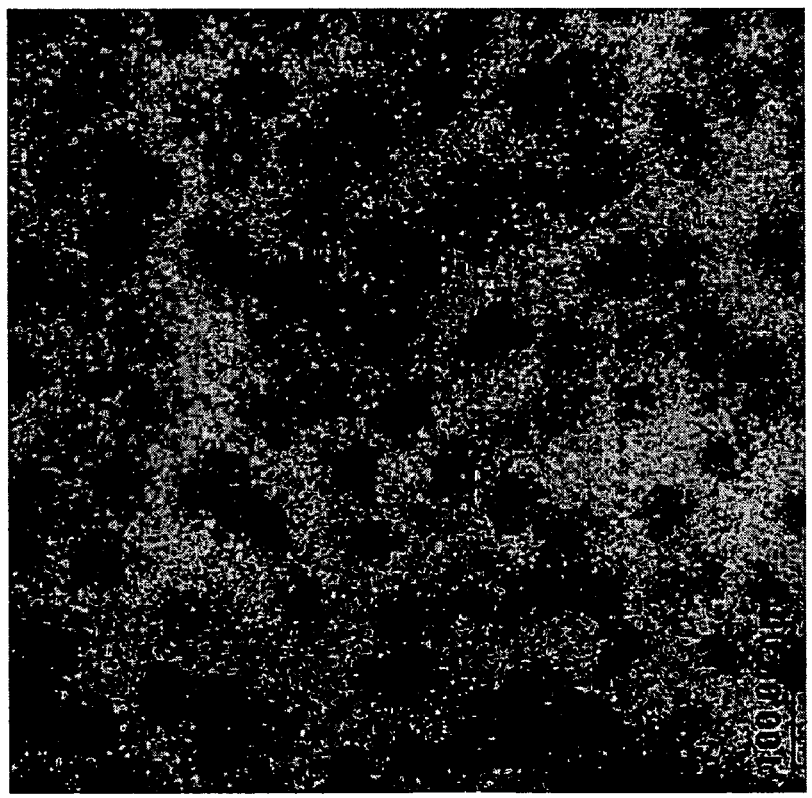
FIG. 1 is a TEM photograph of polymer nanoparticles formed in accordance with EXAMPLE 1.

A 7.5 L polymerization reactor was used for the preparation. The reactor was first charged with 517 g of hexane, followed by 1.0 kg butadiene/hexane blend (22.0 wt % of butadiene). The reactor was then heated to 57° C. After the temperature stabilized, the reactor was first charged with 2.5 mL of 1.6 M OOPS. The polymerization was initiated with 5.0 mL of a 1.68 M solution of butyl lithium in hexane. The batch temperature was maintained at 57° C. for the duration of the polymerization. After 2 hours (when the reaction was finished), the reactor was charged with 680 g of styrene/hexane blend (33 wt % of styrene). After additional two-hour reaction, the reactor was charged with 1.8 kg of Hexane. After another additional 20 minutes, the reactor was charged with 50 mL of divinyl benzene. The temperature was maintained at 57° C. for two-hours, and a small amount of the product was taken for GPC analysis. The GPC analysis of the product showed that the micelle polymer had a number average molecular weight of 1,027,000. The polydispersity of the molecular weight was 1.11. The conversion of the reaction is about 100%. The NMR analysis showed that the product contains 50% of butadiene and 50% of styrene. The polybutadiene contains 22% cis, 18% trans and 60% vinyl structures. The product was dropped into isopropanol, precipated, and drum dried. TEM analysis (FIG. 1) showed nano-sized particles.

EXAMPLE 2

Preparation of Maleated Particle Polymers

A 2000 mL three-neck round-bottom flask was used for the preparation. The middle neck was connected with a mechanical string motor. The left neck was used to charge various materials. The right neck was open for $N_2$ purging and thermometer placing. To the flask, 300 mL of DTDP oil (C.P. Hall) and 60 g of maleic anhydride (Aldrich) were charged. The flask was placed into a silicon oil bath and heated to 170° C. After temperature was stabilized, 500 mL of the hexane solution containing 10% of the product from Example 1 was added in droplet fashion into the flask. The charging speed was very slow and the process took about 2 hrs. After charging, the flask was maintained at 180° C. for half hour. The product was dropped into toluene and precipitated via addition of isopropenol. The product was washed five times with isopropenol. TEM analysis (FIG. 2) showed nano-sized particles. $^{13}$C NMR analysis shows that the BR shell of particles contains about 2.8 wt % covalently bonded maleic anhydride. The product was insoluble in hexane.

EXAMPLES 3–4

Three 40 mL bottles were charged according to the following descriptions. Those bottles were then identified as bottle A, B, and C, respectively. The material inside those bottles was named accordingly as material A, B, and C.

A) 0.5 g of the products from Example 2 was added into 15 g THF solvent. After vigorous stirring for half hour, the maleated particles were dissolved. The solution was completely transparent.

B) 0.5 g of the products from Example 2 was added into 15 g toluene solvent. After vigorous stirring for half hour, the maleated particles were dissolved. The solution was completely transparent.

C) 0.5 g of $CuAc_2$ was added into a 15 g of THF solvent. After vigorous stirring for half hour, the $CuAc_2$ was dissolved. The solution was transparent to light.

EXAMPLE 3

Preparation of Copper Ion-Polymer Particle Composite

The bottle B was then charged with 1.5 mL of solution from bottle C. The resulting solution was placed in a vacuum oven at 50° C. Further drying of the product under vacuum yielded a polymer micelle-Cu complex film. The film was dark blue, but transparent to light. In addition, the resulting film was insoluble in toluene, indicating that a new polymer complex was formed.

EXAMPLE 4

Preparation of $Cu_2$ S-Polymer Particle Composite

Bottle A was charged with 1.5 mL of solution from bottle C. The resulting solution was dark blue color. $H_2S$ gas was bubbled through the solution to fully convert the Cu ions to CuS. The solution was purged with $N_2$ to remove excess $H_2S$. The resulting solution was dark colored, with no evidence of macroscopic precipitation of CuS from the solution. This indicated the CuS particles formed are nanoscaled. The resulting solution was placed in a vacuum oven at 50° C. Further drying of the product under vacuum yielded a polymer micelle-CuS nanocomposite film. The material was black, but transparent to light.

EXAMPLE 5

Preparation of Azocarboxylated Particle Polymers

A 2000 mL three-neck round-bottom flask was used for the preparation. The middle neck was connected with a mechanical string motor. The left neck was used to charge various materials. The right neck was opened to $N_2$ purging and thermometer placing. 200 mL of DTDP oil (from C.P. Hall) and 70 g of diisopropyl azocarboxylate (from Aldrich) were charged to the flask. The flask was placed into a silicon oil bath and heated to 90° C. After the temperature stabilized, 660 g of the toluene solution containing 10% of the product from Example 1 was added in droplet fashion into the flask. The charging speed was slow, over about 2 hrs. After charging, the flask was heated to 100° C. and held at that temperature for two hours. The flask was then heated to 110° C. and held at that temperature for another two hours. Finally, the flask was heated to between 120° C. and 125° C. and held at that temperature for three hours.

The product was dropped into hexane, and a light-yellow product precipitated from the hexane solution. The product was washed five times with hexane. GPC analysis of the product, using polystyrene/THF as the standard, showed that the polymer had a number average molecular weight ($M_n$) of 857,900. The polydispersity of the molecular weight was 1.09. $^{13}C$ NMR analysis C=O and styrene showed that the product contained about 86.7 parts of chemically bonded diisopropyl azocarboxylate over one hundred parts (by weight) of the polymer of Example 1. The product was soluble in methanol, ethanol, isopropanol, THF, chloroform, and toluene, but not soluble in hexane and cyclohexane.

EXAMPLES 6–8

Preparation of Nano-sized Copper Sufide (CuS) Particles

Three 40 mL bottles were charged according to the following descriptions. The bottles were then named as bottle D, E, and F respectively. The material inside those bottles was named accordingly as material D, E, and F.

D) 0.5 g of the product from Example 5 were added into 15 g toluene solvent. After vigorous stirring for half hour, the azocarboxylated particles were dissolved resulting in a transparent solution.

E) 0.5 g of $CuAc_2$ (from Aldrich) was added into a 15 g of THF solvent. After vigorous stirring for half hour, the $CuAc_2$ was dissolved resulting in a transparent to light solution.

F) 15 g pure toluene.

EXAMPLE 6

Preparation of Polymer CuS Nanoparticle Film

Bottle D was charged with 1.5 mL of solution from bottle E. The resulting solution was dark blue color. $H_2S$ gas (Aldrich) was bubbled through the solution to fully convert the Cu ions to CuS. The solution was purged with $N_2$ to remove excess $H_2S$. The resulting solution is dark colored, with no macroscopic precipitation of CuS from the solution for a period of one month, indicating formation of nanoscale CuS particles complexed to the nanoparticles of Example 5. The resulting solution was placed in a vacuum oven at 50° C. Further drying of the product under vacuum yielded a polymer micelle-CuS nanocomposite film. The film was black, but transparent to light.

EXAMPLE 7

Bottle F was charged with 1.5 mL of solution from bottle E. The resulting solution was dark blue color. $H_2S$ gas was then bubbled through the solution to fully convert the Cu ions to CuS. The solution was purged with $N_2$ to remove excess $H_2S$. The resulting solution showed macroscopic precipitation of CuS from the solution.

EXAMPLE 8

Preparation of CuS Nanoparticles

Figure 4:
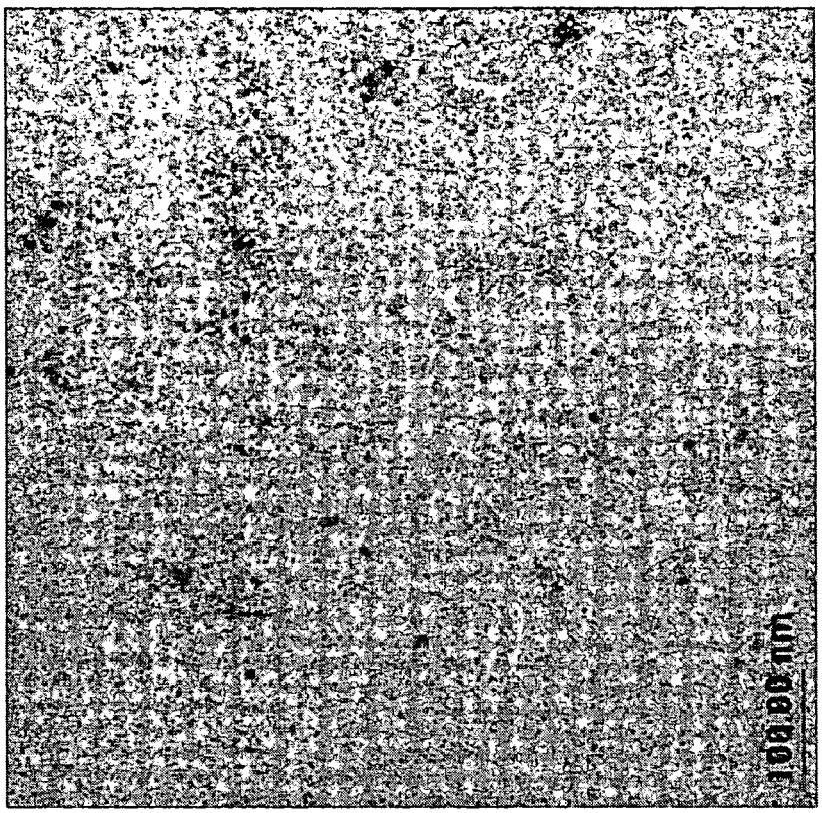
FIG. 4 is a TEM photograph of metal nanocomposites formed in accordance with EXAMPLE 8.
Figure 3:
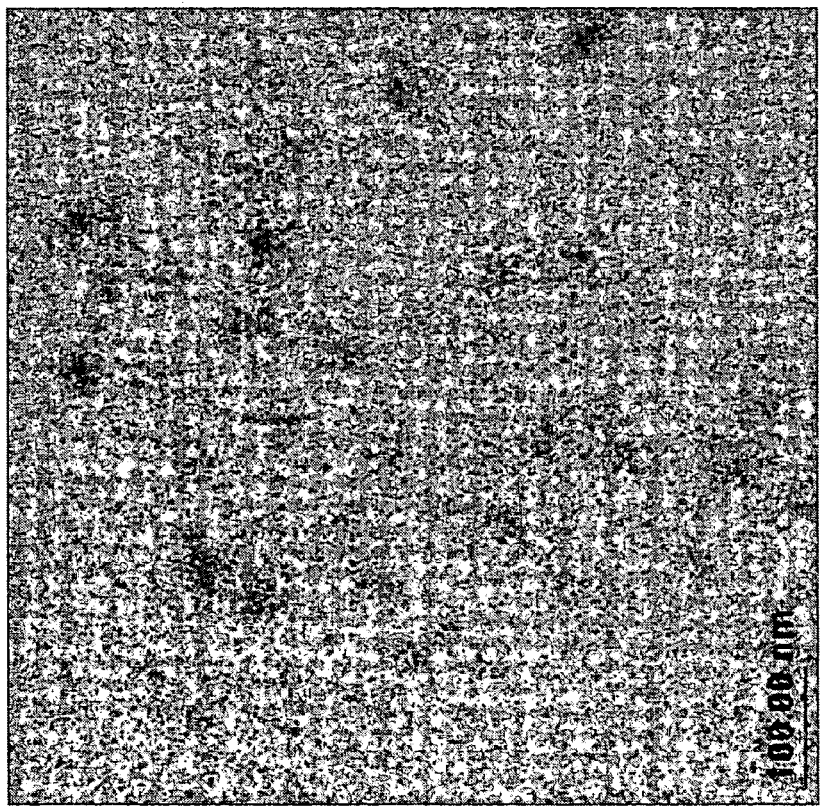
FIG. 3 is a TEM photograph of metallized polymer nanoparticles formed in accordance with EXAMPLE 8.

A transmission electron microscopy (TEM) analysis was performed on the solution in bottle D after the $H_2S$ treatment. The solution was further diluted with a toluene solvent to about $10^{-5}$ wt %. A drop of the diluted solution was then coated on a graphed copper micro-grid. After the solvent was evapourized, the screen was examined by TEM. The results showed that the polymer synthesized is a particle-like material and the average particle size was about 40 nm (FIG. 3). The CuS nano particles existed inside of each polymer particle and the average particle size of CuS crystals was 5 to 10 nm (FIG. 4). It is noted that the two pictures were taken at the same position, but the focus depths were different.

EXAMPLE 9

Preparation of Azocarboxylated Particle Polymers

A 2000 mL three-neck round-bottom flask was used for the preparation. 740 g of the toluene solution containing 10% of the product from Example 6 and 100 g of diisopropyl azocarboxylate (from Aldrich) were added to the flask together. The flask was purged with $N_2$ for 0.5 hours. The flask was then heated to 115° C. and held at that temperature for seven hours. The product was dropped into hexane, and a light-yellow product was precipitated. The product was washed five times with hexane. GPC analysis of the product, using polystyrene/THF as the standard, showed that the polymer had a $M_n$ of 858,200. The polydispersity of the nanoparticles was 1.10 $^{13}C$ NMR analysis showed the product contained about 121 parts of covalently bonded diisopropyl azocarboxylate over one hundred parts (by weight) of the polymers of Example 1. The product was soluble in methanol, ethanol, isopropanol, THF, chloroform, and toluene, but was insoluble in hexane and cyclohexane.

EXAMPLES 10–11

Three 40 mL bottles were charged according to the following description. The bottles were then named as bottle G, H, and I, respectively. The material inside those bottles was named accordingly as material G, H, and I.

G) 0.5 g of the products from Example 9 was added to 15 g toluene solvent. After vigorous stirring for half hour, the azocarboxylated particles were dissolved, and the solution was completely transparent.

H) 0.5 g of CdAc (Aldrich) was added to 15 g of MeOH solvent. After vigorous stirring for half hour, the CdAc was dissolved resulting in a transparent and colorless solution.

I) 15 g pure toluene.

EXAMPLE 10

Preparation of Polymer CdS Nanoparticle Film

Figure 6:
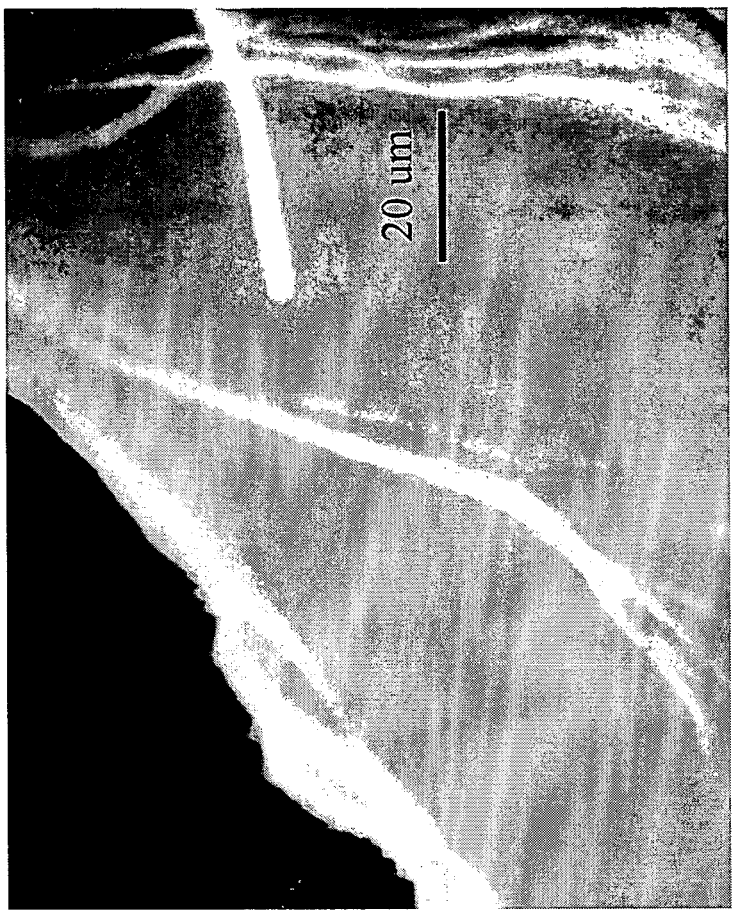
FIG. 6 is a UV optical/microscope picture of CdS/polymer film of Example 10.
Figure 5:
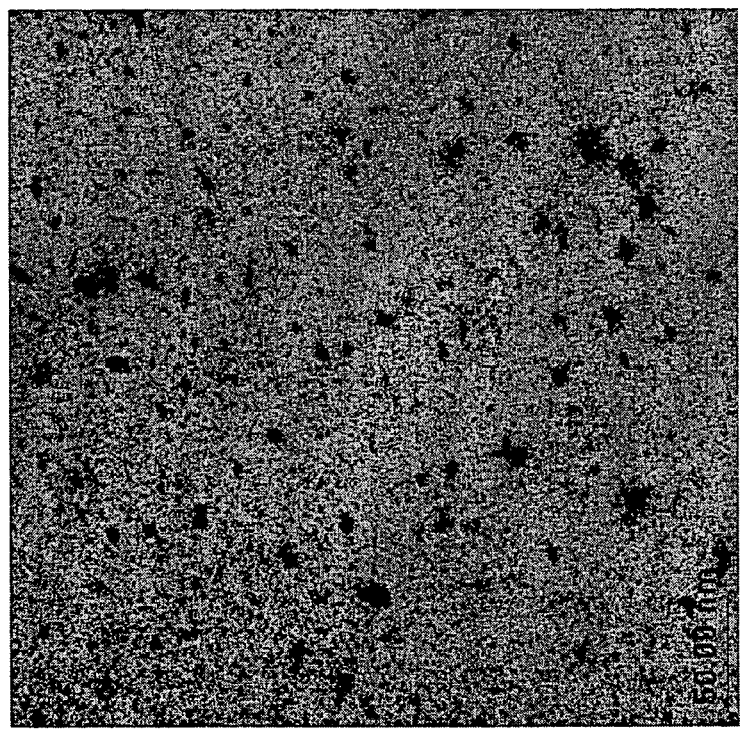
FIG. 5 is a TEM photograph of CdS nano-crystals formed in accordance with Example 10.

Bottle G was charged with 1.5 mL of solution from bottle H. $H_2S$ gas was bubbled through the solution to fully convert the Cd ions to CdS. The solution was purged with $N_2$ to remove excess of $H_2S$. The resulting solution was yellow, with no macroscopic precipitation of CdS from the solution for a period of one month, indicating formation of nano-scaled CdS particles complexed to the nanoparticles of Example H. The resulting solution was placed in a vacuum oven at 50° C. Further drying of the product under vacuum yielded a polymer nanocomposite film. The film was yellow colored, but transparent to light. Azo functionalized polymer micellar particles developed in our laboratory were used to prepare the nano-sized CdS crystals. The obtained nanocrystals were about 8 nm in diameter (FIG. 5) and were formed inside the individual micellar polymer particles of about 40 nm in diameter. The characterization was performed using an Olympus-$BH_2$ microscopy equipped with a Polaroid camera. Polymer films containing CdS were checked in a UV light. The CdS nano-crystals showed fluorescence under blue light (320 to 400 nm). As can be seen in the photograph of FIG. 6, the film containing the CdS crystals was glowing as compared to the background.

EXAMPLE 11

Bottle I was charged with 1.5 mL of solution from bottle H. $H_2S$ gas was bubbled through the solution to fully convert the Cd ions to CdS. The solution was purged with $N_2$ to remove excess $H_2S$. The resulting solution showed macroscopic precipitation of the yellow CdS from the solution.

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A polymer nanoparticle comprising:
   a. an inner layer including alkenylbenzene monomer units,
   b. an outer layer including monomer units selected from the group consisting of conjugated diene, alkylene, alkenylbenzenes, and mixtures thereof,
   c. at least one functional group associated with said outer layer, and
   d. at least one metal complexed with said functional group;
   wherein said functional group is selected from the group consisting of maleimide, hydroxyl, carboxyl formyl, azocarboxy, epoxide, amino and mixtures thereof; or wherein said functional group is provided by a dicarboxylic anhydride.

2. The polymer nanoparticle of claim 1, a plurality of which is substantially monodisperse.

3. The polymer nanoparticle of claim 1 further including a core comprised of conjugated diene and vinylstyrene monomer units.

4. The polymer nanoparticle of claim 1 wherein said alkenylbenzene monomer units are selected from the group consisting of styrene, α-methyl styrene, 1-vinyl naphthalene, 2-vinyl naphthalene, 1-α-methyl vinyl naphthalene, 2-α-methyl vinyl naphthalene, vinyl toluene, methoxystyrene, β-butoxystyrene, and cycloalkyl, aryl, alkaryl, and aralkyl derivatives thereof, in which the total number of carbon atoms in the combined hydrocarbon is not greater than 18, and any di-or tri-substituted aromatic hydrocarbons, and mixtures thereof.

5. The polymer nanoparticle of claim 1 wherein said alkylene monomer units are formed by hydrogenating said conjugated diene monomer units.

6. The polymer nanoparticle of claim 1 wherein said functional group is polar.

7. The polymer nanoparticle of claim 1 wherein said metal is selected from the group consisting of Cu, Ti, Fe, Cd, Ni, Pd, and mixtures thereof.

8. The polymer nanoparticle of claim 1 wherein said nanoparticle is crosslinked.

9. The polymer nanoparticle of claim 1 wherein said nanoparticle has a mean average diameter of less than about 100 nm.

10. The polymer nanoparticle of claim 1 wherein said dicarboxylic anhydride is selected from the group consisting of anhydride, acetic anhydride, succinic anhydride, phthalic anhydride, oxalic anhydride, malonic anhydride, glutaric anhydride, dimethyl malonic anhydride, adipic anhydride, pimelic anhydride, α,α-dimethyl succinic anhydride, sebacic anhydride, fumaric anhydride, itaconic anhydride, citraconic anhydride, isophthalic anhydride, telephthalic anhydride, tetrachloroterephthalic anhydride, and mixtures thereof.

11. A polymer nanoparticle comprising:
   a. an inner layer including alkenylbenzene monomer units,
   b. an outer layer including monomer units selected from the group consisting of conjugated diene, alkylene, alkenylbenzenes, and mixtures thereof,
   c. at least one polar functional group associated with said outer layer, and
   d. at least one metal complexed with said functional group.

12. A polymer nanoparticle comprising:
   a. an inner layer including alkenylbenzene monomer units,
   b. an outer layer including monomer units selected from the group consisting of conjugated diene, alkylene, alkenylbenzenes, and mixtures thereof,
   c. at least one functional group associated with said outer layer, and
   d. at least one metal selected from Cu, Ti, Fe, Cd, Ni, Pd and mixtures thereof, complexed with said functional group.

13. A process for forming polymer nanoparticles comprising:
   a. polymerizing alkenylbenzene monomer and conjugated diene monomer in a hydrocarbon solvent to form a diblock polymer;
   b. forming micelles of said diblock polymer;
   c. adding at least one cross-linking agent to the micelles to form crosslinked nanoparticles, said nanoparticles having an inner layer including alkenylbenzene monomer units and a outer layer including monomer units selected from the group consisting of alkenylbenzenes, conjugated dienes, and mixtures thereof, d. reacting said nanoparticles with at least one functional group to form functionalized nanoparticles, and e. exposing said functionalized nanoparticles with a metal to cause metal nanocomposites to associate with said functional group.

14. The process of claim 13 wherein step a is performed in the presence of a lithium initiator.

15. The process of claim 13 wherein an alkane solvent charge is made between steps b and c or during step c.

16. The process of claim 13 further including a hydrogenation step after step b, c, or d.

17. The process of claim 13 wherein said conjugated diene monomer units are selected from the group consisting of $C_4$–$C_8$ conjugated dienes and mixtures thereof.

18. The process of claim 13 wherein said alkenylbenzene monomer units of the inner layer and outer layer are independently selected from the group consisting of styrene, α-methyl styrene, 1-vinyl naphthalene, 2-vinyl naphthalene, 1-α-methyl vinyl naphthalene, 2-α-methyl vinyl naphthalene, vinyl toluene, methoxystyrene, β-butoxystyrene, and cycloalkyl, aryl, alkaryl, and aralkyl derivatives thereof, in which the total number of carbon atoms in the combined hydrocarbon is not greater than 18, and any di-or tri-substituted aromatic hydrocarbons, and mixtures thereof.

19. The process of claim 13 wherein said functional group is selected from the maleimide, hydroxyl, carboxy, formyl, azocarboxy, epoxide, amino, and mixtures thereof.

20. The process of claim 19 wherein said functional group is provided by a dicarboxylic anhydride selected from the group consisting of anhydride, acetic anhydride, succinic anhydride, phthalic anhydride, oxalic anhydride, malonic anhydride, glutaric anhydride, dimethyl malonic anhydride, adipic anhydride, pimelic anhydride, α,α-dimethyl succinic anhydride, sebacic anhydride, fumaric anhydride, itaconic anhydride, citraconic anhydride, isophthalic anhydride, telephthalic anhydride, tetrachloroterephthalic anhydride, and mixtures thereof, hydroxyl, carboxy, formyl, azocarboxy, epoxide, amino, and mixtures thereof.

21. The process of claim 13 wherein said metal is selected from the group consisting of Cu, Ti, Fe, Cd, Ni, Pd, and mixtures thereof.

22. The process of claim 13 wherein step d is performed before step c.

23. The process of claim 13 further comprising releasing said metal nanocomposites from said functionalized nanoparticle by performing a solvent change.

24. The process of claim 13 wherein said metal nanocomposite has a mean average diameter between about 0.1 and 50 nm.

25. A metal nanocomposite formed by the steps comprising:

a. polymerizing alkenylbenzene and conjugated diene monomer in a hydrocarbon solvent to form a diblock polymer;

b. forming a mixture including micelles of said diblock polymer;

c. adding at least one cross-linking agent to the mixture to form a crosslinked nanoparticle from said micelles, said nanoparticle having an inner layer including monomer units selected from the group consisting of alkenylbenzenes, conjugated dienes, and mixtures thereof, d. reacting said nanoparticle with at least one monomer having a functional group to form a functionalized nanoparticle, e. contacting said functionalized nanoparticle with a metal such that said metal complexes with said functional group to form a metal nanocomposite, and f. releasing said metal nanocomposite from said functionalized nanoparticle by performing a solvent charge;

wherein said functional group is selected from the group consisting of maleimide, hydroxyl, carboxyl formyl, azocarboxy, epoxide, amino and mixtures thereof; or wherein said functional group is provided by a dicarboxylic anhydride.

26. The metal nanocomposite of claim 25 wherein said metal nanocomposite includes at least one metal selected from the group consisting of Cu, Ti, Fe, Cd, Ni, Pd, and mixtures thereof.

* * * * *